United States Patent [19]

Iizuka

[11] Patent Number: 4,917,457
[45] Date of Patent: Apr. 17, 1990

[54] BEAM SEPARATING PRISM
[75] Inventor: Takashi Iizuka, Tokyo, Japan
[73] Assignee: Asahi Kogaku Kogyo Kabushiki Kaisha, Tokyo, Japan
[21] Appl. No.: 201,815
[22] Filed: Jun. 3, 1988
[30] Foreign Application Priority Data Jun. 8, 1987 [JP] Japan .......................... 62-142440[U]
Jun. 11, 1987 [JP] Japan ............................ 62-90024[U]

[51] Int. Cl.⁴ ......................... G02B 27/14; G02B 5/04
[52] U.S. Cl. ..................................... 350/173; 350/286
[58] Field of Search ............... 350/286, 287, 169, 171, 350/173

[56] References Cited
U.S. PATENT DOCUMENTS 3,521,944 7/1970 Kishikawa ............................ 350/173
4,113,354 9/1978 Yamasita et al. .................... 350/286
4,707,064 11/1987 Dobrowolski et al. ............. 350/173

FOREIGN PATENT DOCUMENTS 2412083 8/1977 Fed. Rep. of Germany .
2032645A 5/1980 United Kingdom .

Primary Examiner—Bruce Y. Arnold
Assistant Examiner—Ronald M. Kachmarik
Attorney, Agent, or Firm—Sughrue, Mion, Zinn, Macpeak & Seas

[57] ABSTRACT

An endoscope attachment has optics for viewing with the naked eye having the first optical axis coinciding with the optical axis of an endoscope, imaging optics having the second optical axis perpendicular to the first optical axis, and a beam separating prism that splits rays of light coming from the endoscope into two beams that are respectively launched into the two optics. The beam separating prism has an entrance end face and the first exit end face which are both oriented perpendicular to the first optical axis, a first reflecting plane disposed between the entrance end face and the first exit end face, a second exit end face oriented perpendicular to the second optical axis, and a second reflecting plane disposed between the first optical axis and the second exit end face. The faces and planes are arranged in such a way that the rays of light reflected by the first reflecting plane are reflected successively by the entrance end face, the second exit end face and the second reflecting plane before they emerge from said second exit end face, so that the point of intersection between the first optical axis and the first reflecting plane is positioned closer to the entrance end face than the point of intersection between the first and second optical axes.

9 Claims, 3 Drawing Sheets

BEAM SEPARATING PRISM

BACKGROUND OF THE INVENTION

The present invention relates to a beam separating prism and more particularly to an endoscope attachment that enables rays of light coming from the eyepiece section of an endoscope to be used in viewing with the naked eye or imaging with a video camera or the like.

Rays of light entering a beam separating prism in one direction pass through it and emerge therefrom as two split beams that are perpendicular to each other. A prism having this beam splitting capability and which is of the simplest design is a cubic half-mirror prism 1 of the type shown in FIG. 5. If this half-mirror prism 1 is disposed in such a way that the half-mirror plane 1a is inclined at 45 degrees with respect to an incident light beam, rays of light that meet the entrance end face 1b in a perpendicular direction are partly transmitted through the prism and emerge from the first exit end face 1c in a perpendicular direction, with the remainder of the incident rays being reflected by the half-mirror plane 1a and emerging from the second exit end face 1d, again in a perpendicular direction.

A problem with the prism shown in FIG. 5 is that the image formed by the rays of light reflected from the half-mirror plane 1a is inverted with respect to the one formed by the rays of light being transmitted through the half-mirror plane 1a.

In an endoscope attachment that uses rays of light coming from the eyepiece of an endoscope in viewing with the naked eye or imaging with a video camera, an upright image needs to be finally formed in both the viewing and imaging optics. Therefore, if two beams issuing from a beam splitting prism could be directly used to form an upright image without letting them pass through any optical element that produces an inverted image, certain advantages would be offered not only in terms of the number of optical components but also in terms of the size of the overall equipment.

It has been proposed that a penta prism capable of even-numbered reflections for beam separation be used and the optics for an endoscope attachment be constructed as shown in FIG. 6.

Rays of light coming from the eyepiece section 2 of an endoscope pass through spacers 3 and 4 and enter a penta prism 5 through an entrance end face 5a; part of them are transmitted straight through the first reflecting plane 5b and emerge from the first exit end face 5c, with the remaining rays being reflected by the first reflecting plane 5b and the second reflecting plane 5d and emerging from the second exit end face 5e.

Although not shown, the beam emerging from the first exit end face 5c is guided into the optics for viewing with the naked eye having an optical axis $l_1$ which coincides with the optical axis of the endoscope, whereas the beam emerging from the second exit end face 5e is guided into the optics for imaging with a video camera having an optical axis $l_2$ which is perpendicular to the optical axis $l_1$.

The arrangement described above has the advantage that an upright image can be formed in both the viewing and imaging optics without employing any optical component that causes image inversion. In this arrangement, the optical axes $l_1$ and $l_2$ of the viewing and imaging optics are made perpendicular to each other in order to facilitate the working for rendering the system waterproof.

In consideration of the imaging lens barrel and the thickness of the endoscope, the distance, OP, from the final end face of the eyepiece section 2 in the endoscope attachment described above to the optical axis, $l_2$, of the imaging optics is set to the smallest value (in this case, 14.25 mm).

On the other hand, in terms of the field of vision that can be attained with the attachment optics for viewing with the naked eye, the distance between the eyepiece section 2 of the endoscope and the first exit end face 5c of the penta prism 5 is desirably as short as possible since as the length of an optical path along the axis $l_1$ increases, the smaller portion of the rays of light in the marginal area will fall on the viewer's eye.

However, in the endoscope attachment that uses the penta prism 5 shown in FIG. 6, point Q at which the optical axis $l_1$ intersects the first reflecting plane 5b is positioned closer to the first exit end face 5c than point P where the optical axis $l_1$ intersects the optical axis $l_2$, so if the distance, OP, between the eyepiece section 2 and the optical axis $l_2$ of the imaging optics is preliminarily determined, the distance OR between the eyepiece section 2 and the first exit end face 5c of the penta prism 5 cannot be made reasonably short (in the case being considered, OR is 19.5 mm).

SUMMARY OF THE INVENTION

The present invention has been accomplished in order to solve the aforementioned problems of the prior art. The principal object, therefore, of the present invention is to provide an endoscope attachment that enables the distance between the eyepiece section of an endoscope and the first exit end face of a beam splitting prism to be reasonably shortened even if the distance from the eyepiece section to the optical axis of imaging optics is preliminarily determined.

In order to attain the above-stated object, the present invention employs a special beam separating prism for splitting rays of light coming from an endoscope into two beams, one being launched into the optics for viewing with the naked eye which has the first optical axis coinciding with the optical axis of the endoscope and the other being launched into the imaging optics having the second optical axis perpendicular to the first optical axis. This beam separating prism has an entrance end face and the first exit end face which are both perpendicular to the first optical axis, the first reflecting plane positioned between the entrance end face and the first exist end face, the second exit end face which is perpendicular to the second optical axis, and the second reflecting plane positioned between the first optical axis and the second exit end face. These faces and planes are arranged in such a way that the rays of light reflected by the first reflecting plane are reflected successively by the entrance end face, the second exit end face and the second reflecting plane before they emerge from the second exit end face. In addition, the point which the first optical axis intersects the first reflecting plane is positioned closer to the entrance end face that the point at which the first optical axis intersects the second optical axis.

In the endoscope attachment of the present invention which has the construction described above, rays of light coming from an endoscope and which are launched into a beam separating prism through the entrance end face are partly transmitted straight through the prism to be guided into the optics for viewing with the naked eye, and the other part of the rays is successively reflected four times by the first reflecting plane, the entrance end face, the second exit end face and the second reflecting plane before it is guided into the imaging optics.

DESCRIPTION OF THE PREFERRED EMBODIMENTS

The present invention is described hereinafter with reference to the accompanying drawings. FIGS. 1–4 show one embodiment of the present invention.

First, by referring to FIGS. 2-4, the composition of a beam separating prism 10 to be applied to the endoscope attachment of the present invention is described below.

Figure 2:
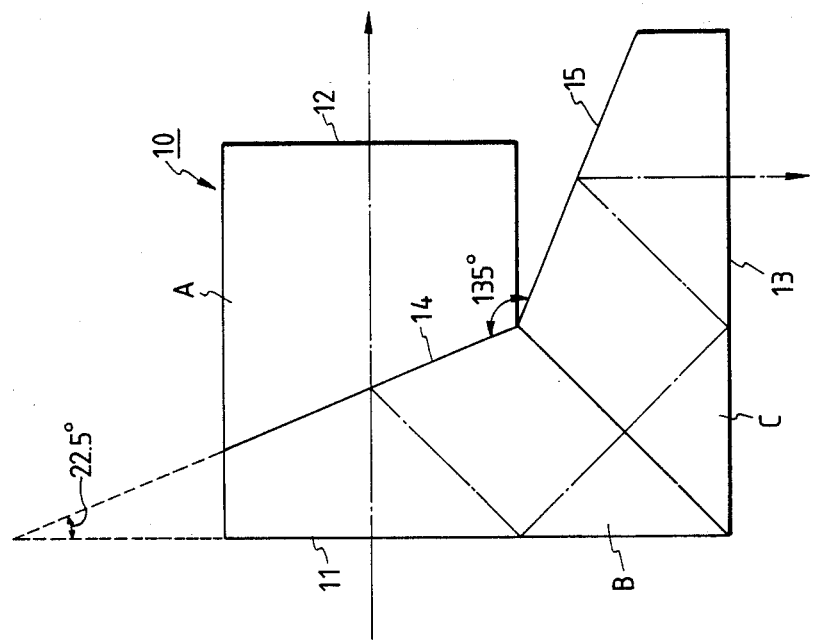
FIG. 2 is a side view of a beam separating prism useful in the endoscope attachment shown in FIG. 1.
Figure 5:
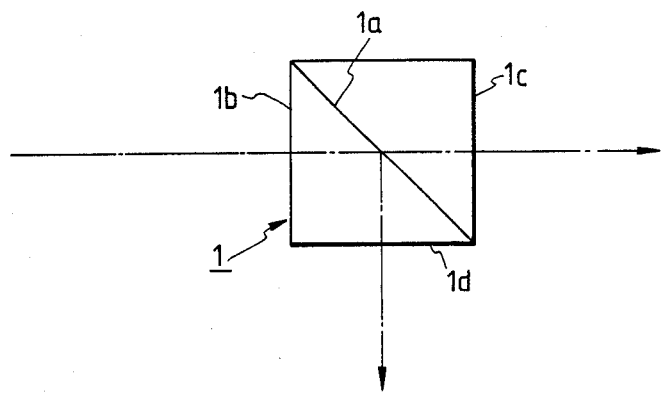
FIG. 5 is a diagram showing how a beam is split by a half-mirror prism and on which optical path the split beams travel.

As shown in FIG. 2, the beam splitting prism 10 has an entrance end face 11 and the first exit end face 12 which are parallel to each other, as well as the second exit end face 13 which is perpendicular to both the entrance end face 11 and the first exit end face 12.

Between the entrance end face 11 and the first exit end face 12 is provided the first reflecting plane 14 that allows part of the rays of light coming from the entrance end face 11 to be reflected back toward said entrance end face 11 while causing the other part of the rays to be transmitted toward the first exit end face 12. the first reflecting plane 14 is inclined at an angle of 22.5° with respect to the entrance end face 11 so that the reflected rays will travel toward the entrance end face 11 and be reflected therefrom inwardly toward the second exit end face 13.

Between the optical path of the beam passing through the first reflecting plane 14 and the second exit end face 13 is provided the second reflecting plane 15 by which the rays of light coming from the entrance end face 11 and which are reflected successively by the first reflecting plane 14, entrance end face 11 and the second exit end face 13 are further reflected so as to emerge from the second exit end face 13. This second reflecting plane 15 is inclined at an angle of 135° with respect to the first reflecting plane 14.

Figure 3:
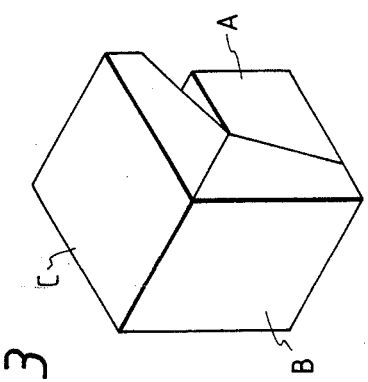
FIG. 3 is a perspectivce view of the prism shown in FIG. 2.
Figure 4:
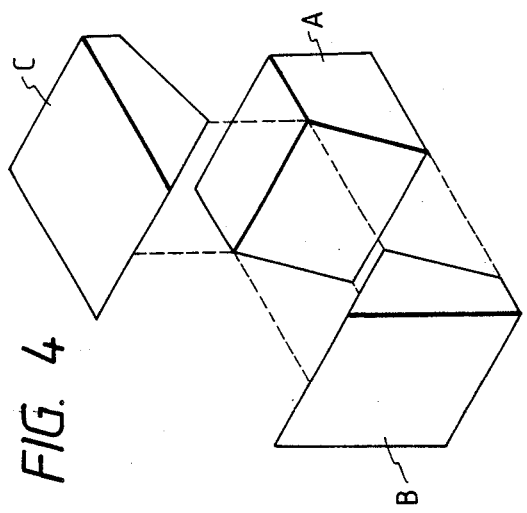
FIG. 4 is an exploded view of the prism shown in FIG. 2.

A method for realizing the above-described face orientation without requiring undue difficulties in fabrication is shown in FIGS. 3 and 4. As shown, the beam splitting prism 10 can be fabricated by joining a trapezoidal block A with two wedge-shaped blocks B and C that are identical in shape.

Figure 1:
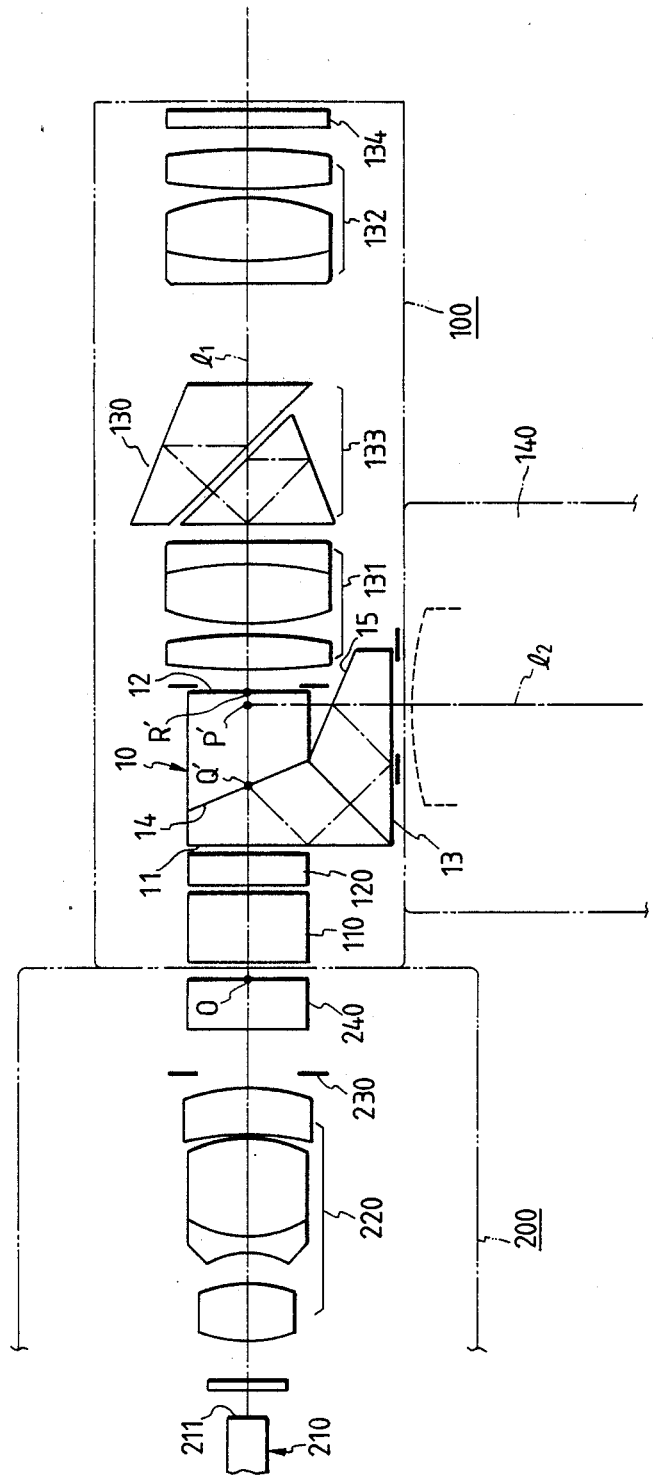
FIG. 1 shows a layout of optical components in an endoscope attachment according to one embodiment of the present invention.

FIG. 1 is a diagrammatic representation of optics showing an endoscope attachment 100 and part of an endoscope 200, with the attachment 100 incorporating the beam splitting prism 10 having the composition described above.

The endoscope 200 has an imageguide fiber bundle 210 for carrying the image of an object formed via an objective lens system (not shown), an eyepiece unit 220 that collimates the rays of light issuing from the exit end face 211 of the fiber bundle 210, a diaphragm stop 230 and a cover glass 240.

The endoscope attachment 100 is furnished with glass spacers 110 and 20, and the above-described beam splitting prism 10. The incident rays coming from the endoscope 200 are split by the prism 10 into two beams, one being launched into optics 130 for viewing with the naked eye which has an optical axis $l_1$ coinciding with the optical axis of the endoscope 200 and the other being launched into imaging optics 140 having an optical axis $l_2$ which is perpendicular to the optical axis $l_1$.

Figure 6:
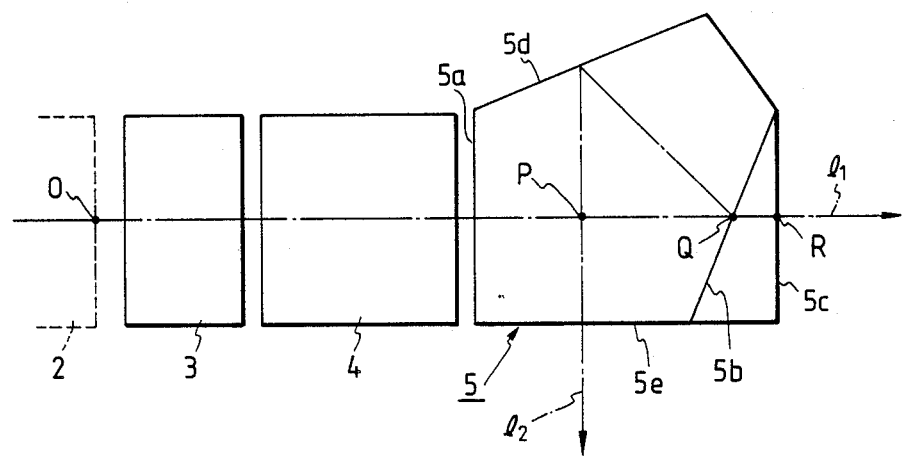
FIG. 6 is a simplified cross-sectional view of a prior art endoscope attachment incorporating a penta prism.

In the beam splitting prism 10, point Q' at which the optical axis $l_1$ intersects the first reflecting plane 14 is positioned closer to the entrance end face 11 than point P' where the optical axis $l_1$ intersects the optical axis $l_2$. So, even if the distance OP' from the cover glass 240 of the endoscope 200 to point P' is set at 14.25 mm, the distance OR' from the cover glass 240 to the first exit end face 12 can be adjusted to 15 mm, which is 4.5 mm shorter than the distance required in the case of using a penta prism of the composition shown in FIG. 6.

The viewing optics 130 is furnished with the first lens unit 131 for converging the rays of light issuing from the first exit end face 12 of the beam splitting prism 10, the second lens unit 132 for recollimating the convergent rays, a Schmidt-Pechan compound prism 133 that is disposed between the two lens units 131 and 132 and which produces an upright image of the object by five reflections, and a cover glass 134. The optics 130 has the same composition s that of the optics of a binocular capable of magnification at unity. The compound prism 133 has the additional capability of reducing the mechanical length of the optics as compared with the length of the optical path.

If the optical composition is the sole design consideration, the viewing optics of the endoscope attachment 100 could be constructed by disposing the cover glass 134 right ahead the first exit end face 12 of the beam splitting prism 10. However, in consideration of the mechanical position of the viewing optics relative to the lens barrel of the imaging optics 140, the above-described alternative would make it practically impossible to have the viewer's eye positioned at the intended eye point.

To solve this problem, the viewer may shift his eye further ahead of the cover glass 240 but if he simply does this, the problem already mentioned will occur, that is, the less portion of the rays of light in the marginal area will fall on the viewer's eye as the distance from the cover glass 240 on the endoscope 200 increases. therefore, in accordance with the present invention, the eye point is shifted further ahead of the cover glass by allowing the rays of light coming from the first exit end face 12 of the prism 10 to be converged first and then collimated again.

The imaging optics 140 is composed of a zoom lens system (not shown) and a CCD imaging device on which the image of the object is formed by the zoom lens system and which converts the optical information of the object to an electric signal which is then supplied to an external monitor TV set or video deck.

As described on the foregoing pages, the endoscope attachment of the present invention enables the distance between the eyepiece section of an endoscope and the first exit end face of a beam splitting prism to be reasonably shortened even if the distance from the eyepiece section to the optical axis of imaging optics is preliminarily determined. Because of this feature, the attachment permits even the marginal portion of rays of light emanating from the endoscope to fall on the viewer's eye and yet the overall length of the attachment is made shorter than has been possible in the prior art.

What is claimed is:

1. In an optical attachment having an optical system for viewing with the naked eye having a first optical axis coinciding with an optical axis of an endoscope, an imaging optical system having a second optical axis at a first non-zero angle relative to said first optical axis, and a beam separating prism that splits rays of light coming from the endoscope into two beams that are respectively launched into the two optical systems, the improvement wherein said beam separating prism has an entrance end face and a first exit end face which are both oriented perpendicular to said first optical axis, a first reflecting plane disposed between said entrance end face and said first exit end face, a second exit end face oriented at a second predetermined angle relative to said second optical axis, and a second reflecting plane disposed physically between said first optical axis and said second exit end face, said faces and planes being arranged in such a way that the rays of light reflected by said first reflecting plane are reflected successively by said entrance end face, said second exit end face and said second reflecting plane before they emerge from said second exit end face, and with a point of intersection between said first optical axis and said first reflecting plane being positioned closer to said entrance end face than a point of intersection between said first and second optical axes.

2. The optical attachment according to claim 1, wherein said first predetermined angle comprises a right angle.

3. The optical attachment according to claim 1, wherein said second predetermined angle comprises a right angle.

4. A beam separating prism having an entrance end face and a first exit end face which are parallel with each other, said beam separating prism having a second exit end face at a first non-zero angle relative to said entrance end face and said first exit end face whereby rays of light entering from said entrance end face in perpendicular relation to said entrance end face are emitted from said first exit end face and said second exit end face, respectively, wherein a first reflecting plane for reflecting a part of the rays of light entering from said entrance end face back to said entrance end face and allowing the rest of the rays to pass toward said first exit end face is disposed physically between said entrance end face and said first exit end face, said first reflecting plane being inclined so that the rays of light directed toward said entrance end face are reflected inwardly from said entrance end face optically toward said second exit end face; and wherein a second reflecting plane for emitting, from said second exit end face, the rays of light entering from said entrance end face and reflecting in order from said first reflecting plane, said entrance end face, said second exit end face and said second reflecting plane is disposed physically between an optical path of the rays of light passing through said first reflecting plane and said second exit end face, whereby a point of intersection between an optical axis of the rays of light entering perpendicular into said entrance end face and said first reflecting plane is closer to said entrance end face than a point of intersection between said optical axis of the rays of light entering perpendicular into said entrance exit and an optical axis of the rays of light emitting from said second end face.

5. The prism according to claim 4, wherein said first predetermined angle comprises a right angle.

6. The prism according to claim 4, wherein said rays of light entering from said entrance end face in perpendicular relation to said entrance end face are emitted from said first and second exit end faces in perpendicular relation thereto, respectively.

7. The prism according to claim 4, further comprising a first wedge-shaped optical block B, a second wedge-shaped optical block C and a trapezoidal optical block A, wherein said entrance end face is formed in said first optical block B; said first reflecting plane is formed between said first optical block B and said trapezoidal optical block A; said first exit end face is formed in said trapezoidal optical block A; and said second reflecting plane and said second exit end face are formed in said wedge-shaped optical block C.

8. The prism according to claim 7, wherein said first wedge-shaped optical block B and said second wedge-shaped optical block C are formed so as to have the same physical dimensions.

9. A beam separating prism having an entrance end face and a first exit end face which are parallel with each other, said beam separating prism having a second exit end face at a first predetermined angle relative to said entrance end face and said first exit end face whereby rays of light entering from said first entrance end face travel along a first optical axis and are emitted from said first exit end face and are also emitted from said second exit end face along a second optical axis, wherein a first reflecting plane for reflecting a part of the rays of light entering from said entrance end face back to said entrance end face and allowing the rest of the rays to pass toward said first exit end face is disposed physically between said entrance end face and said first exit end face, said first reflecting plane being inclined so that the rays of light directed toward said entrance end face are reflected inwardly from said entrance end face optically toward said second exit end face, a point of intersection between said first optical axis and said first reflecting plane being closer to said entrance end face than a point of intersection between said first and second optical axes.

* * * * *